United States Patent
VanBlon et al.

(10) Patent No.: US 11,330,029 B2
(45) Date of Patent: May 10, 2022

(54) SHARING CONTENT WITH A DETECTED DEVICE (71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 98 days.

(21) Appl. No.: 15/937,204

(22) Filed: Mar. 27, 2018

(65) Prior Publication Data
US 2019/0306212 A1 Oct. 3, 2019

(51) Int. Cl.
*H04W 8/00* (2009.01)
*H04L 65/613* (2022.01)

(52) U.S. Cl.
CPC ......... *H04L 65/4092* (2013.01); *H04W 8/005* (2013.01)

(58) Field of Classification Search
CPC .............. H04W 8/005; H04L 65/4092; H04L 29/0854; H04L 29/08081; H04L 29/08; H04L 29/02; H04N 21/00
See application file for complete search history.

(56) References Cited

U.S. PATENT DOCUMENTS

| | | | | |
|---|---|---|---|---|
| 8,001,217 B1* | 8/2011 | Pan | ......................... | H04W 4/08 709/219 |
| 9,648,518 B2* | 5/2017 | Chen | ................. | H04W 72/1215 |
| 9,743,145 B2* | 8/2017 | Abecassis | ........... | H04N 21/4126 |
| 9,894,505 B2* | 2/2018 | Kearney, III | ............ | H04L 12/66 |
| 11,212,150 B2* | 12/2021 | Baldemair | ......... | H04W 72/1257 |
| 11,218,854 B2* | 1/2022 | Raleigh | .................. | G06F 3/0482 |
| 2001/0044846 A1* | 11/2001 | Cohn | ...................... | G06Q 30/02 709/227 |
| 2009/0113346 A1* | 4/2009 | Wickramasuriya | ...... | G06F 8/443 715/825 |
| 2010/0138416 A1 | 6/2010 | Bellotti | | |
| 2011/0283334 A1* | 11/2011 | Choi | ...................... | H04W 4/023 725/148 |
| 2013/0208184 A1* | 8/2013 | Castor | ................. | H04N 21/4126 348/552 |
| 2014/0012999 A1* | 1/2014 | Chang | .................. | H04L 12/1407 709/228 |
| 2014/0307585 A1* | 10/2014 | Kearney, III | .......... | H04L 49/604 370/254 |

(Continued)

FOREIGN PATENT DOCUMENTS

CN 102244676 A 11/2011

*Primary Examiner* — Dhairya A Patel
(74) *Attorney, Agent, or Firm* — Kunzler Bean & Adamson (57) ABSTRACT

Apparatuses, methods, systems, and program products are disclosed for sharing content with a detected device. A method includes presenting, by a processor, content on a first information handling device. The method includes detecting a second information handling device that is communicatively coupled to the first information handling device. The method includes sending information about the content presented on the first information handling device to the second information handling device for presentation on the second information handling device in response to determining that the second information handling device is configured to present the content.

20 Claims, 5 Drawing Sheets

(56) References Cited

U.S. PATENT DOCUMENTS

| | | | |
|---|---|---|---|
| 2015/0373060 A1* | 12/2015 | Shmilov | H04L 65/1069 370/329 |
| 2016/0034245 A1* | 2/2016 | Karunakaran | G06F 3/1454 345/2.2 |
| 2016/0080292 A1* | 3/2016 | Szeto | G06Q 10/10 715/752 |
| 2016/0094648 A1* | 3/2016 | Han | H04W 12/003 709/209 |
| 2016/0262056 A1* | 9/2016 | Chen | H04W 72/082 |
| 2016/0381158 A1* | 12/2016 | Curtis | H04L 67/22 709/204 |
| 2017/0005814 A1* | 1/2017 | Gandotra | H04L 47/32 |
| 2017/0339226 A1* | 11/2017 | Hensgen | H04N 21/4126 |
| 2018/0004684 A1* | 1/2018 | Ihara | H04N 13/20 |
| 2018/0025379 A1 | 1/2018 | Hewinson et al. | |
| 2018/0063062 A1* | 3/2018 | Burdakov | H04L 67/306 |
| 2018/0288814 A1* | 10/2018 | Ayoub | H04W 76/18 |
| 2019/0069015 A1* | 2/2019 | Kiley | H04N 21/61 |
| 2020/0077142 A1* | 3/2020 | Lavie | H04N 21/44029 |
| 2021/0195106 A1* | 6/2021 | VanBlon | H04N 5/23245 |

\* cited by examiner

SHARING CONTENT WITH A DETECTED DEVICE

FIELD

The subject matter disclosed herein relates to presenting content on devices and more particularly relates to presenting content displayed on first device on a second device in response to detecting the second device.

BACKGROUND

Internet of things devices such as smart televisions, smart speakers, smart appliances, and/or the like may generally be connected to one another over a network such as a home network, an office network, etc. However, sharing content between Internet of things devices may require a user to manually select a device to share content to, which may be difficult if the desired device does not have an easy way to identify it such as an easily identifiable name.

BRIEF SUMMARY

An apparatus for sharing content with a detected device is disclosed. The apparatus, in one embodiment, includes a first information handling device that includes a processor and a memory that stores code executable by the processor. In one embodiment, the memory stores code executable by the processor to present content on the first information handling device. In a further embodiment, the memory stores code executable by the processor to detect a second information handling device that is communicatively coupled to the first information handling device. In certain embodiments, the memory stores code executable by the processor to send information about the content presented on the first information handling device to the second information handling device for presentation on the second information handling device in response to determining that the second information handling device is configured to present the content.

A method for sharing content with a detected device includes, in one embodiment, presenting, by a processor, content on a first information handling device. The method, in some embodiments, includes detecting a second information handling device that is communicatively coupled to the first information handling device. The method, in various embodiments, includes sending information about the content presented on the first information handling device to the second information handling device for presentation on the second information handling device in response to determining that the second information handling device is configured to present the content.

A program product for sharing content with a detected device, in one embodiment, includes a computer readable storage medium that stores code executable by a processor. In some embodiments, the executable code includes code to perform presenting content on a first information handling device. The executable code, in certain embodiments, includes code to perform detecting a second information handling device that is communicatively coupled to the first information handling device. The executable code, in certain embodiments, includes code to perform sending information about the content presented on the first information handling device to the second information handling device for presentation on the second information handling device in response to determining that the second information handling device is configured to present the content.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for sharing content with a detected device is disclosed. The apparatus, in one embodiment, includes a first information handling device that includes a processor and a memory that stores code executable by the processor. In one embodiment, the memory stores code executable by the processor to present content on the first information handling device. In a further embodiment, the memory stores code executable by the processor to detect a second information handling device that is communicatively coupled to the first information handling device. In certain embodiments, the memory stores code executable by the processor to send information about the content presented on the first information handling device to the second information handling device for presentation on the second information handling device in response to determining that the second information handling device is configured to present the content.

In one embodiment, the code is further executable by the processor to send the information about the content to the second information handling device in response to a type of the content matching a type of content that the second information handling device is configured to present. In some embodiments, the type of the content is selected from the group consisting of video, audio, text, and images.

In one embodiment, the code is further executable by the processor to present a prompt to confirm sending the information about the content to the second information handling device prior to sending the information about the content to the second information handling device. In certain embodiments, the code is further executable by the processor to stop presenting the content on the first information handling device in response to the content being presented on the second information handling device.

In further embodiments, the code is further executable by the processor to continue presenting the content on the first information handling device in response to the content being presented on the second information handling device. In various embodiments, the code is further executable by the processor to determine a schedule comprising times indicating when types of content are typically presented on the second information handling device and send information about the content presented on the first information handling device to the second information handling device in response to a current time corresponding to a time of the determined schedule when the type of the content is typically presented.

In one embodiment, the code is further executable by the processor to send information about the content presented on the first information handling device to the second information handling device in response to the second information handling device comprising an application that is configured to present the content. In some embodiments, the code is further executable by the processor to send information about the content presented on the first information handling device to the second information handling device in response to detecting an application that is configured to present the content executing on the second information handling device.

In various embodiments, the code is further executable by the processor to send the information about the content presented on the first information handling device to the second information handling device in response to determining that that the second information handling device is typically used to present a type of the content presented on the first information handling device based on historical usage data of the second information handling device.

In one embodiment, the information about the content presented on the first information handling device is selected from the group consisting of a link to an accessible network location for the content and a stream of the content from the first information handling device to the second information handling device over a network. In some embodiments, detecting the second information handling device includes detecting that the second information handling device is within a proximity of the first information handling device. In various embodiments, the proximity of the first information handling device to the second information handling device is determined based on data from one or more sensors, the one or more sensors selected from the group consisting of BLUETOOTH® sensors, near-field communication sensors, proximity sensors, infrared sensors, and Wi-Fi signal sensors.

A method for sharing content with a detected device includes, in one embodiment, presenting, by a processor, content on a first information handling device. The method, in some embodiments, includes detecting a second information handling device that is communicatively coupled to the first information handling device. The method, in various embodiments, includes sending information about the content presented on the first information handling device to the second information handling device for presentation on the second information handling device in response to determining that the second information handling device is configured to present the content.

In one embodiment, the method includes sending the information about the content to the second information handling device in response to a type of the content matching a type of content that the second information handling device is configured to present. In some embodiments, the method includes presenting a prompt to confirm sending the information about the content to the second information handling device prior to sending the information about the content to the second information handling device.

In some embodiments, the method includes stopping presentation of the content on the first information handling device in response to the content being presented on the second information handling device. In various embodiments, the method includes continuing to present the content on the first information handling device in response to the content being presented on the second information handling device.

In one embodiment, the method includes sending information about the content presented on the first information handling device to the second information handling device in response to the second information handling device comprising an application that is configured to present the content. In certain embodiments, the method includes sending information about the content presented on the first information handling device to the second information handling device in response to detecting an application that is configured to present the content executing on the second information handling device.

A program product for sharing content with a detected device, in one embodiment, includes a computer readable storage medium that stores code executable by a processor. In some embodiments, the executable code includes code to perform presenting content on a first information handling device. The executable code, in certain embodiments, includes code to perform detecting a second information handling device that is communicatively coupled to the first information handling device. The executable code, in certain embodiments, includes code to perform sending information about the content presented on the first information handling device to the second information handling device for presentation on the second information handling device in response to determining that the second information handling device is configured to present the content.

Figure 1:
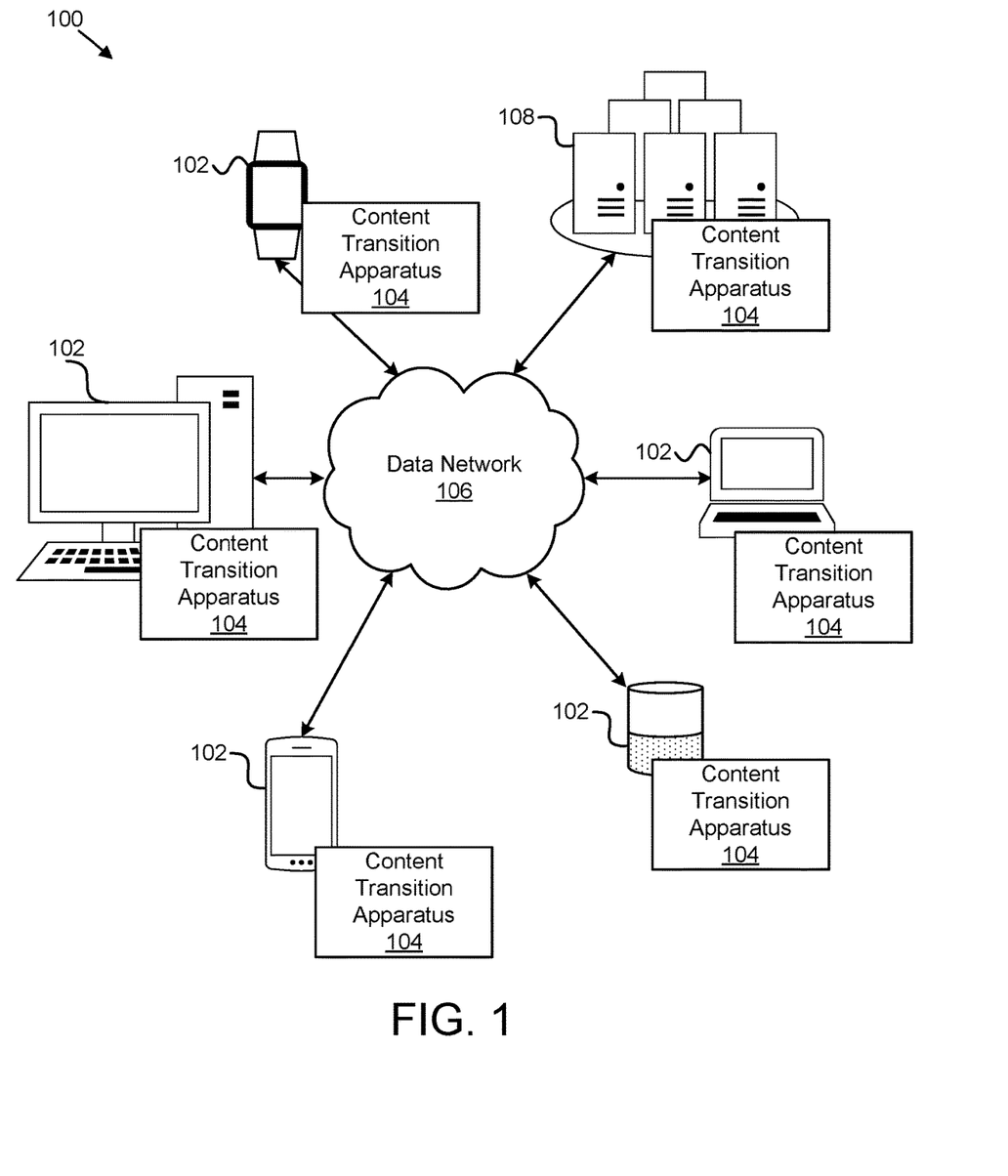
FIG. 1 is a schematic block diagram illustrating one embodiment of a system for sharing content with a detected device.

FIG. 1 is a schematic block diagram illustrating one embodiment of a system 100 for sharing content with a detected device. In one embodiment, the system 100 includes one or more information handling devices 102, one or more content transition apparatuses 104, one or more data networks 106, and one or more servers 108. In certain embodiments, even though a specific number of information handling devices 102, content transition apparatuses 104, data networks 106, and servers 108 are depicted in FIG. 1, one of skill in the art will recognize, in light of this disclosure, that any number of information handling devices 102, content transition apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for presenting, displaying, and/or the like content such as multimedia content (e.g., videos, television, images, audio, text files, spreadsheets, slideshow presentations, and/or the like), streaming content (e.g., streaming video, audio, etc.), and/or the like.

In certain embodiments, the information handling devices 102 comprise "Internet of Things" ("IoT") devices. As used herein, the IoT comprises a network of physical devices, e.g., vehicles, home appliances, home electronics, and/or other items that are embedded with electronics, software, sensors, actuators, and connectivity which enables these objects to connect and exchange data. Some of the data that may be exchanged may include multimedia content, various types of files, and/or the like, as described above.

In one embodiment, the content transition apparatus 104 is configured to send information about content being presented on a first device to a second device that is communicatively coupled to the first device and is configured to present content of the same type as the content presented on the first device. For example, if a user is watching video content on a digital assistant such as an Amazon Echo Show, and the user turns on a television that is near the digital assistant, e.g., within the same room in the user's house, while the video is playing on the digital assistant, the content transition apparatus 104 may detect the television (e.g., using proximity sensors, based on network information, and/or the like), determine that the television is configured to play video content, and automatically share information for playing the video on the television from the digital assistant so that the user can continue to enjoy the video on the television instead of, or in addition to, the digital assistant. The content transition apparatus 104, including its various sub-modules, may be located on one or more information handling devices 102 in the system 100, one or more servers 108, one or more network devices, and/or the like. The content transition apparatus 104 is described in more detail below with reference to FIGS. 2 and 3.

In one embodiment, the content transition apparatus 104 improves upon conventional methods for sharing digital content between devices because it does not require the user to manually select devices to share the content with. For example, other systems may allow the user to "cast" the content from one device to another device; however, to be able to "cast" the content, the user is required to specify a device to "cast" to by selecting a device name, which may be cryptic, unidentifiable, or otherwise difficult to identify from a potentially long list of devices. The content transition apparatus 104, on the other hand, automatically detects a second device, e.g., when a device connects to a network, when a device that is within a proximity of the first device, and/or the like, and determines whether the second device is configured to play the content, and send information about the content from the first device to the second device so that the content can be presented on the second device without requiring the user to select which device he/she would like to send the content to.

In various embodiments, the content transition apparatus 104 may be embodied as a hardware appliance that can be installed or deployed on an information handling device 102, on a server 108, or elsewhere on the data network 106. In certain embodiments, the content transition apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., BLUETOOTH®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the content transition apparatus 104 may include a power interface, a wired and/or wireless network interface, a graphical interface that attaches to a display, and/or a semiconductor integrated circuit device as described below, configured to perform the functions described herein with regard to the content transition apparatus 104.

The content transition apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the content transition apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the content transition apparatus 104.

The semiconductor integrated circuit device or other hardware appliance of the content transition apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the content transition apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a BLUETOOTH® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, such as multimedia and other content that may be presented on various IoT devices within the data network 106.

Figure 2:
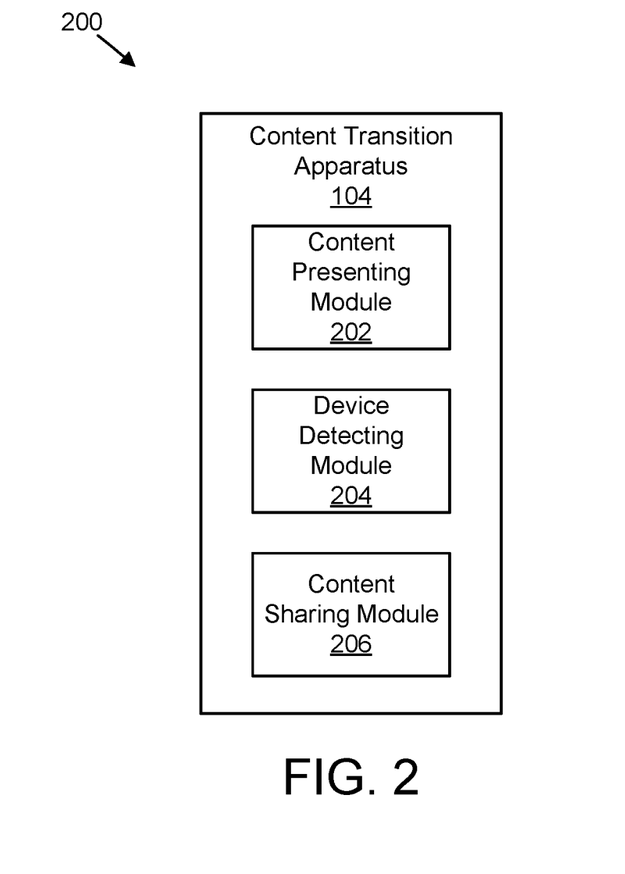
FIG. 2 is a schematic block diagram illustrating one embodiment of an apparatus for sharing content with a detected device.

FIG. 2 is a schematic block diagram illustrating one embodiment of an apparatus 200 for sharing content with a detected device. In one embodiment, the apparatus 200 includes an embodiment of a content transition apparatus 104. The content transition apparatus 104, in some embodiments, includes one or more of a content presenting module 202, a device detecting module 204, and a content sharing module 206, which are described in more detail below.

In one embodiment, the content presenting module 202 is configured to present content on a first information handling device 102. As described above, the content may be video content, e.g., a movie or television program; audio content, e.g., a music file, an audio book, etc.; streaming content, e.g., video streaming from Netflix® or YouTube®, audio streaming from Spotify®, etc.; a slideshow; digital images; text files; spreadsheets; and/or the like.

The content presenting module 202 may present the content on a display of the first information handling device 102, such as a touch-enabled display. The content may be associated with an application executing on the first information handling device 102 such as the YouTube® application, the Spotify® application, the Netflix® application, the Hulu® application, and/or the like.

The device detecting module 204, in one embodiment, is configured to detect a second information handling device 102 that is communicatively coupled to the first information handling device 102. In one embodiment, the device detecting module 204 detects that a second information handling device 102 is within a proximity of the first information handling device 102. For instance, in one embodiment, the first information handling device 102 may include one or more sensors that are configured to detect the presence of other devices within a proximity of the first information handling device 102, e.g., within the same room, within a predefined distance of one another, and/or the like. For example, the first information handling device 102 may include proximity sensors, wireless signal sensors (e.g., BLUETOOTH® sensors, near-field communication ("NFC") sensors, Wi-Fi sensors, infrared sensors, and/or the like), location sensors, and/or the like that may be used to detect the presence of other devices within a proximity of the first information handling device 102.

In further embodiments, the device detecting module 204 may detect when a device is turned on, activated, powered on, and/or the like and connects to the network 106 based on information received from a router, switch, and/or other network device. For example, when a smart television is turned on and connects to the network 106, the network router or switch may pass along identifying network information for the smart television to the other devices on the network 106. In response to the updated network information, in certain embodiments, the device detecting module 204 may further detect whether the device is within a proximity of the first information handling device 102.

In one embodiment, the content sharing module 206 is configured to send information about the content presented on the first information handling device 102 to the second information handling device 102 for presentation on the second information handling device 102 in response to determining that the second information handling device 102 is configured to present the content. For example, the content sharing module 206 may send a hyperlink to the network location for the content, e.g., a YouTube® link, may send a copy of the content from the first information handling device 102 to the second information handling device 102, may stream the content from the first information handling device 102 to the second information handling device 102, and/or the like.

In an example embodiment, a user may be watching a Netflix® movie on his iPad® in his bedroom and decide that he wants to watch it instead on the smart television in his bedroom. When the user turns the smart television on, the device detecting module 204 may detect that the smart television is enabled and the content sharing module 206, described below, may automatically send information about the Netflix® movie to the smart television, such as a link to the movie on Netflix® or a stream of the movie from the iPad® to the smart television.

In certain embodiments, the content sharing module 206 determines whether the second information handling device 102 is configured to present content of the type that is presented on the first information handling device 102. For instance, if the content is video content, the content sharing module 206 may communicate with the second information handling device 102 to determine whether the second information handling device 102 has the capabilities of presenting the video content. For example, if the video file is an MP4 file, the content sharing module 206 may determine whether the second information handling device 102 has the correct codecs to play the MP4 file. Similarly, the content sharing module 206 may determine whether the second information handling device 102 has is configured to, e.g., has the functionality, code, plugins, libraries, codecs, and/or the like to play audio files, display images, open text files, present slideshows, and/or the like.

In further embodiments, the content sharing module 206 may determine whether the second information handling device 102 is typically, generally, ordinarily used, or has a primary use to present content of the type that is presented on the first information handling device 102. For instance, if the second information handling device 102 is a smart television that is not ordinarily used to display text files, the content sharing module 206 may not send the information about the content to the smart television.

The content sharing module 206 may query the second information handling device 102 for information about the types of data that it normally displays, a list of types of recently displayed data, and/or the like. For example, the content sharing module 206 located on the second information handling device 102 may track the types of data that it presents, over time, and the content sharing module 206 may query the list to determine if the second information handling device 102 is typically used to display the content that is presented on the first information handling device 102.

Similarly, the content sharing module 206 may determine a schedule of when particular types of content are typically presented on the second information handling device 102, and may send information about the content presented on the first information handling device 102 to the second information handling device 102 in response to a current time corresponding to a time of the determined schedule when the type of the content is typically presented.

For example, if a smart television is typically used between 3:00 PM and 4:00 PM for watching a particular television program, and the first information handling device 102 is streaming music at 3:15 PM when the smart television is turned on, the content sharing module 206 may not send information about the streaming music to the smart television because it is not normally used at 3:15 PM for streaming music. On the other hand, if the user is streaming the television program to his tablet computer at 3:15 PM and the smart television is then turned on, the content sharing module 206 may send information about the streaming television program to the smart television so that it can present the television program. In such an embodiment, the content sharing module 206 located on the second information handling device 102 tracks the days/times that types of content are presented on the second information handling device 102, which the content sharing module 206 located on the first information handling device 102 may use to determine whether the current time is typically a time for presenting the content that is being displayed on the first information handling device 102 on the second information handling device 102.

In certain embodiments, the content sharing module 206 is configured to send information about the content presented on the first information handling device 102 to the second information handling device 102 in response to the second information handling device 102 comprising an application that is configured to present the content. For instance, if the user is watching a video in the YouTube® application on his smart phone and then turns on his smart television, which also includes a YouTube® application, the content sharing module 206 may send information for the YouTube® video to the smart television such as the YouTube® link to the video so that the video can continue to be played on the smart television. In certain embodiments, the content sharing module 206 queries the second information handling device 102 for information about its executable applications. If the second information handling device 102 does not have an application for presenting the content, the content sharing module 206 may not send information about the content to the second information handling device 102.

In some embodiments, the content sharing module 206 is configured to share information about the content with the second information handling device 102 in response to detecting an application that is configured to present the content executing or being executed on the second information handling device 102. For example, if the user is watching a video on Netflix® on his smart phone, and the user turns on a smart television within the proximity of the smart phone, the content sharing module 206 may not share the content information with the smart television until the user executes the Netflix® application on the smart television, at which time the content sharing module 206 would then send the content information to the smart television so that the content can be presented on the second information handling device 102.

Figure 3:
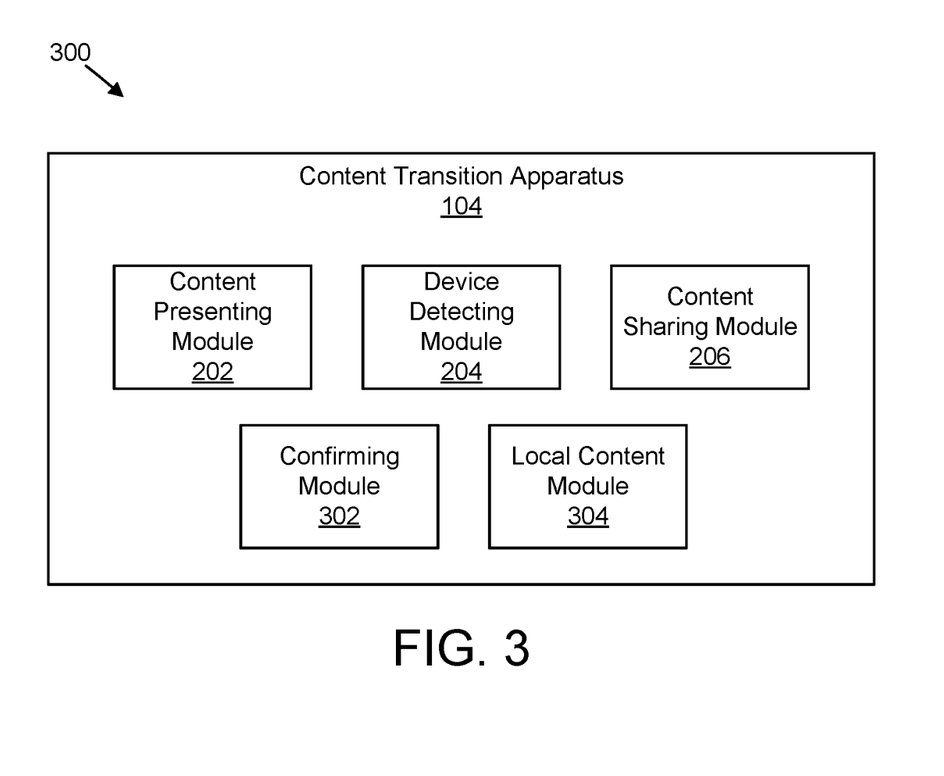
FIG. 3 is a schematic block diagram illustrating one embodiment of another apparatus for sharing content with a detected device.

FIG. 3 is a schematic block diagram illustrating one embodiment of an apparatus 300 for sharing content with a detected device. In one embodiment, the apparatus 300 includes an embodiment of a content transition apparatus 104. The content transition apparatus 104, in some embodiments, includes one or more of a content presenting module 202, a device detecting module 204, and a content sharing module 206, which may be substantially similar to the content presenting module 202, the device detecting module 204, and the content sharing module 206 described above with reference to FIG. 2. In further embodiments, the content transition apparatus 104 includes one or more of a confirming module 302 and/or a local content module 304, which are described in more detail below.

In one embodiment, the confirming module 302 is configured to present a prompt to confirm sending the information about the content to the second information handling device 102 prior to sending the information about the content to the second information handling device 102. For instance, if the content sharing module 206 determines that the second information handling device 102 is configured to present the content that is presented on the first information handling device 102, the confirming module 302 may first display a prompt to the user to confirm that the user wants to continue viewing the content on the second information handling device 102. Over time, the confirming module 302 may learn the user's decisions based on the user's context, e.g., day/time when the content is presented, type of content that is presented, and/or the like, and may skip displaying a prompt to the user and automatically take an action based on the user's previous responses to the prompt.

In one embodiment, the local content module 304 is configured to stop or cease presenting the content on the first information handling device 102 in response to the content being presented on the second information handling device 102. For example, if a video that the user is watching on his tablet computer is transitioned to a smart television when the smart television is turned on, the local content module 304 may cease playing the video on the user's tablet computer.

In some embodiments, the local content module 304 presents the content on the first information handling device 102 again in response to the content no longer being presented on the second information handling device 102, e.g., in response to the second information handling device 102 being turned off, inactivated, asleep, and/or the like. In such an embodiment, local content module 304 receives information from the content sharing module 206 located on the second information handling device 102 about the content such as the current position of the content (e.g., the current location in a video or audio file, the current page of a document, and/or the like) so that the user can continue to enjoy the content on the first information handling device 102.

In various embodiments, the local content module 304 is configured to continue presenting the content on the first information handling device 102 in response to the content being presented on the second information handling device 102. For instance, the content that is presented on the first information handling device 102 may be "copied" to the second information handling device 102 so that the content is presented substantially simultaneously on both devices.

In such an embodiment, the local content module 304 may prompt the user to either move or copy the content on the first information handling device 102. In certain embodiments, the local content module 304 may determine whether other uses continue to use the first information handling device 102 when the content is also presented on the second information handling device 102 (e.g., based on facial recognition, eye tracking, interactions with the first information handling device 102, and/or the like). If so, then the local content module 304 may continue presenting the content on the first information handling device 102. Otherwise, the local content module 304 may cease presenting the content on the first information handling device 102.

Figure 4:
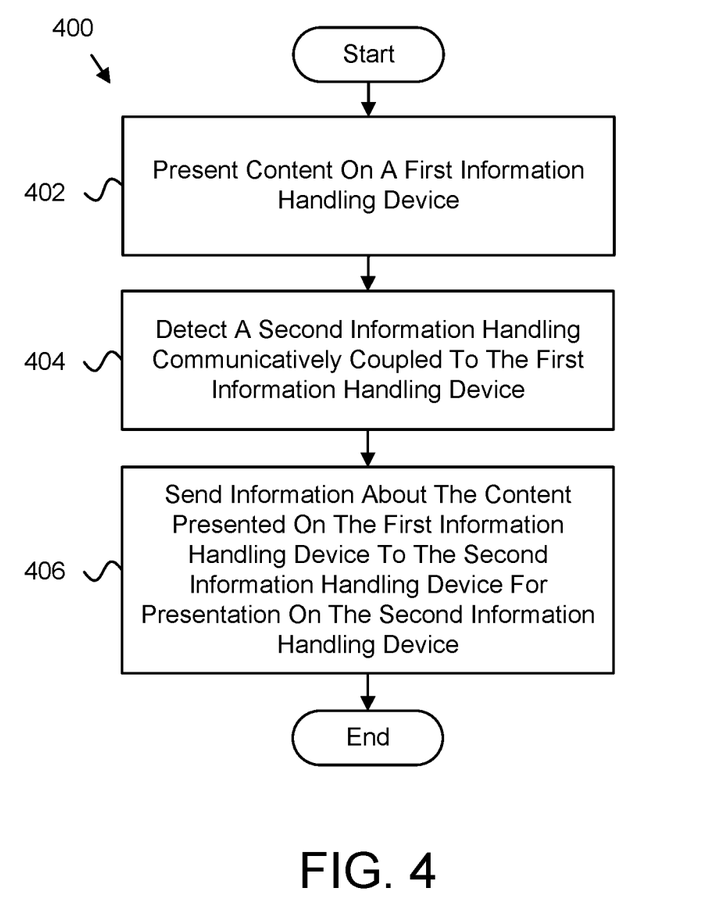
FIG. 4 is a schematic flow chart diagram illustrating one embodiment of a method for sharing content with a detected device.

FIG. 4 is a schematic flow chart diagram illustrating one embodiment of a method 400 for sharing content with a detected device. In one embodiment, the method 400 begins and the content presenting module 202 presents 402 content on a first information handling device 102. In certain embodiments, the device detecting module 204 detects 404 a second information handling device 102 communicatively coupled to the first information handling device 102. In further embodiments, the content sharing module 206 sends 406 information about the content presented on the first information handling device 102 to the second information handling device 102 for presentation on the second information handling device 102 in response to determining that the second information handling device 102 is configured to present the content, and the method 400 ends.

Figure 5:
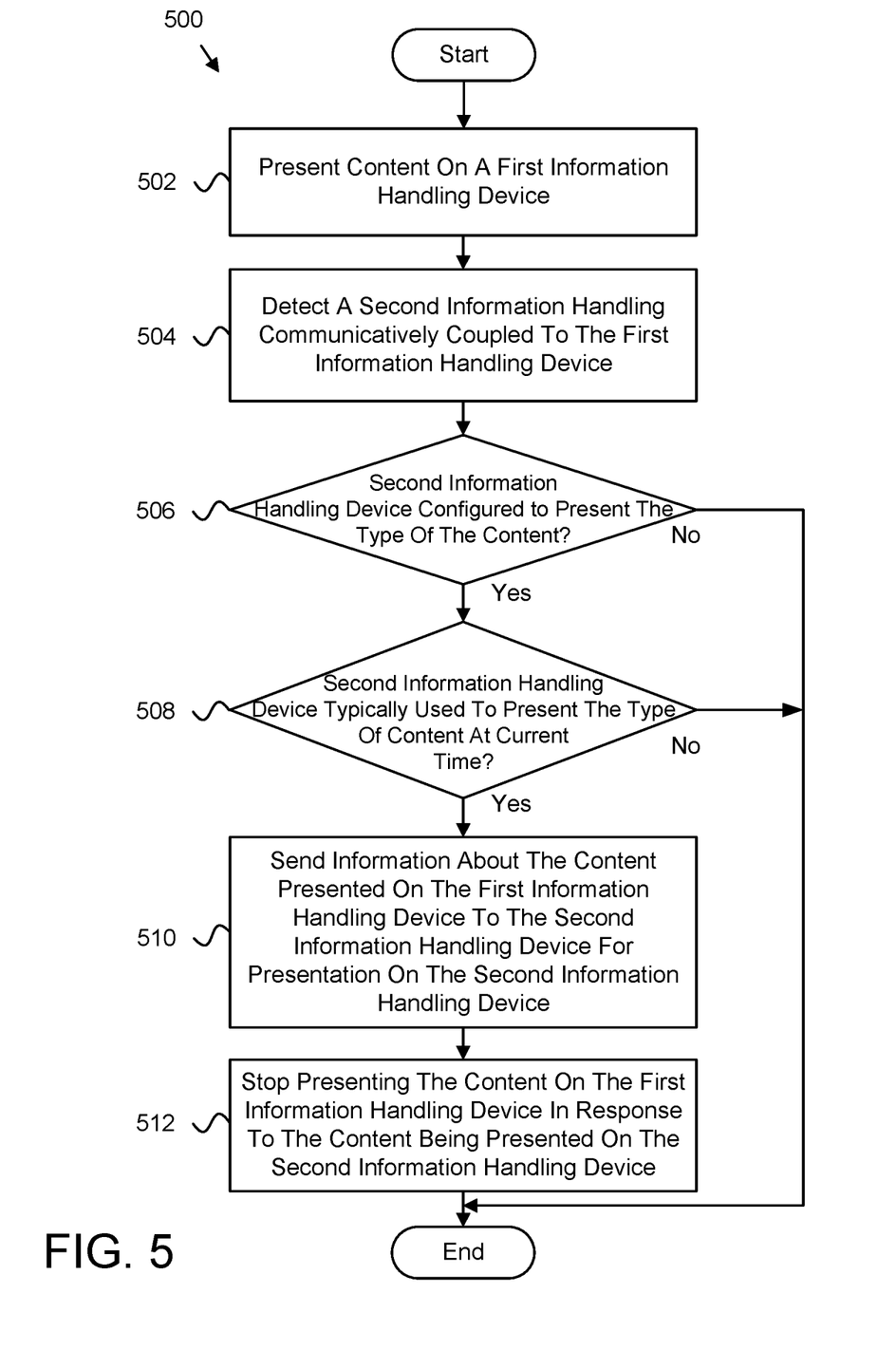
FIG. 5 is a schematic flow chart diagram illustrating one embodiment of another method for sharing content with a detected device.

FIG. 5 is a schematic flow chart diagram illustrating one embodiment of another method 500 for sharing content with a detected device. In one embodiment, the method 500 begins and the content presenting module 202 presents 502 content on a first information handling device 102. In certain embodiments, the device detecting module 204 detects 504 a second information handling device 102 communicatively coupled to the first information handling device 102, e.g., based on the second information handling device's proximity to the first information handling device 102, in response to the second information handling device 102 connecting to the same network as the first information handling device 102, and/or the like.

In various embodiments, the content sharing module 206 determines 506 whether the second information handling device 102 is configured to present content of the type that is presented on the first information handling device 102. If not, the method 500 ends. If so, then the content sharing module 206 determines 508 whether the second information handling device 102 is typically used to present the type of content that is presented on the first information handling device 102 at the current time. If not, then the method 500 ends.

Otherwise, in further embodiments, the content sharing module 206 sends 510 information about the content presented on the first information handling device 102 to the second information handling device 102 for presentation on the second information handling device 102 in response to determining that the second information handling device 102 is configured to present the content. In some embodiments, the local content module 304 stops 512 presenting the content on the first information handling device 102 in response to the content being presented on the second information handling device 102, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores code executable by the processor to:
      present content on a first information handling device using a first application executing on the first information handling device;
      automatically detect a second information handling device that is communicatively coupled to the first information handling device over a data network in response to the second information handling device connecting to the data network and in response to independently determining that the second information handling device is located at a same location as the first information handling device;
      query the second information handling device for historical usage data of the second information handling device, the historical usage data comprising a list of types of content that the second information handling device has recently displayed; and
      automatically, and independent of user input, send the content presented on the first information handling device to the second information handling device for presentation on the second information handling device in response to detecting an application executing on the second information handling device that is the same as the first application that is used to present the content on the first information handling device and in response to determining that the content is of a type that is on the recently displayed list for the second information handling device.

2. The apparatus of claim 1, wherein the code is further executable by the processor to send the content to the second information handling device in response to a type of the content matching a type of content that the second information handling device is configured to present.

3. The apparatus of claim 2, wherein the type of the content is selected from the group consisting of video, audio, text, and images.

4. The apparatus of claim 1, wherein the code is further executable by the processor to stop presenting the content on the first information handling device in response to the content being presented on the second information handling device.

5. The apparatus of claim 4, wherein the code is further executable by the processor to stop presenting the content on the first information handling device in response to determining that there are no users that continue to use the first information handling device to consume the content presented on the first information handling device.

6. The apparatus of claim 1, wherein the code is further executable by the processor to continue presenting the content on the first information handling device in response to the content being presented on the second information handling device.

7. The apparatus of claim 6, wherein the code is further executable by the processor to continue presenting the content on the first information handling device in response to detecting that at least one user continues to use the first information handling device to consume the content presented on the first information handling device.

8. The apparatus of claim 1, wherein the code is further executable by the processor to:
   determine a schedule comprising times indicating when types of content are presented on the second information handling device; and
   send the content presented on the first information handling device to the second information handling device in response to a current time corresponding to a time of the determined schedule when the type of the content is presented.

9. The apparatus of claim 1, wherein the code is further executable by the processor to send the content presented on the first information handling device to the second information handling device in response to the second information handling device comprising an application that is configured to present the content.

10. The apparatus of claim 1, wherein the code is further executable by the processor to send the content presented on the first information handling device to the second information handling device in response to determining that that the second information handling device is used to present a type of the content presented on the first information handling device based on historical usage data of the second information handling device.

11. The apparatus of claim 1, wherein the code is further executable by the processor to send information about the content presented on the first information handling device to the second information handling device, the information selected from the group consisting of a link to an accessible network location for the content and a stream of the content from the first information handling device to the second information handling device over a network.

12. The apparatus of claim 1, wherein detecting the second information handling device includes detecting that the second information handling device is within a proximity of the first information handling device, the proximity of the first information handling device to the second information handling device determined based on data from one or more sensors, the one or more sensors selected from the group consisting of short-wavelength wireless signal sensors, near-field communication sensors, proximity sensors, infrared sensors, and Wi-Fi signal sensors.

13. The apparatus of claim 1, wherein the code is further executable by the processor to present a prompt to confirm sending information about the content to the second information handling device.

14. The apparatus of claim 13, wherein the code is further executable by the processor to learn, over time, a user's responses to the prompt based on the user's context and avoid displaying the prompt to the user and automatically take an action based on the user's previous responses to the prompt.

15. A method comprising:
   presenting, by a processor, content on a first information handling device using a first application executing on the first information handling device;
   automatically detecting a second information handling device that is communicatively coupled to the first information handling device over a data network in response to the second information handling device connecting to the data network and in response to independently determining that the second information handling device is located at a same location as the first information handling device;

querying the second information handling device for historical usage data of the second information handling device, the historical usage data comprising a list of types of content that the second information handling device has recently displayed; and automatically, and independent of user input, sending the content presented on the first information handling device to the second information handling device for presentation on the second information handling device in response to detecting an application executing on the second information handling device that is the same as the first application that is used to present the content on the first information handling device and in response to determining that the content is of a type that is on the recently displayed list for the second information handling device.

16. The method of claim 15, further comprising sending the content to the second information handling device in response to a type of the content matching a type of content that the second information handling device is configured to present.

17. The method of claim 15, further comprising stopping presentation of the content on the first information handling device in response to the content being presented on the second information handling device.

18. The method of claim 15, further comprising continuing to present the content on the first information handling device in response to the content being presented on the second information handling device.

19. The method of claim 15, further comprising sending the content presented on the first information handling device to the second information handling device in response to the second information handling device comprising an application that is configured to present the content.

20. A program product comprising a non-transitory computer readable storage medium that stores code executable by a processor, the executable code comprising code to perform:

presenting content on a first information handling device using a first application executing on the first information handling device;

automatically detecting a second information handling device that is communicatively coupled to the first information handling device over a data network in response to the second information handling device connecting to the data network and in response to independently determining that the second information handling device is located at a same location as the first information handling device;

querying the second information handling device for historical usage data of the second information handling device, the historical usage data comprising a list of types of content that the second information handling device has recently displayed; and automatically, and independent of user input, sending the content presented on the first information handling device to the second information handling device for presentation on the second information handling device in response to detecting an application executing on the second information handling device that is the same as the first application that is used to present the content on the first information handling device and in response to determining that the content is of a type that is on the recently displayed list for the second information handling device.

* * * * *